May 13, 1924.
G. P. PETROPULOS
COFFEE MAKING APPARATUS
Filed Dec. 6, 1923
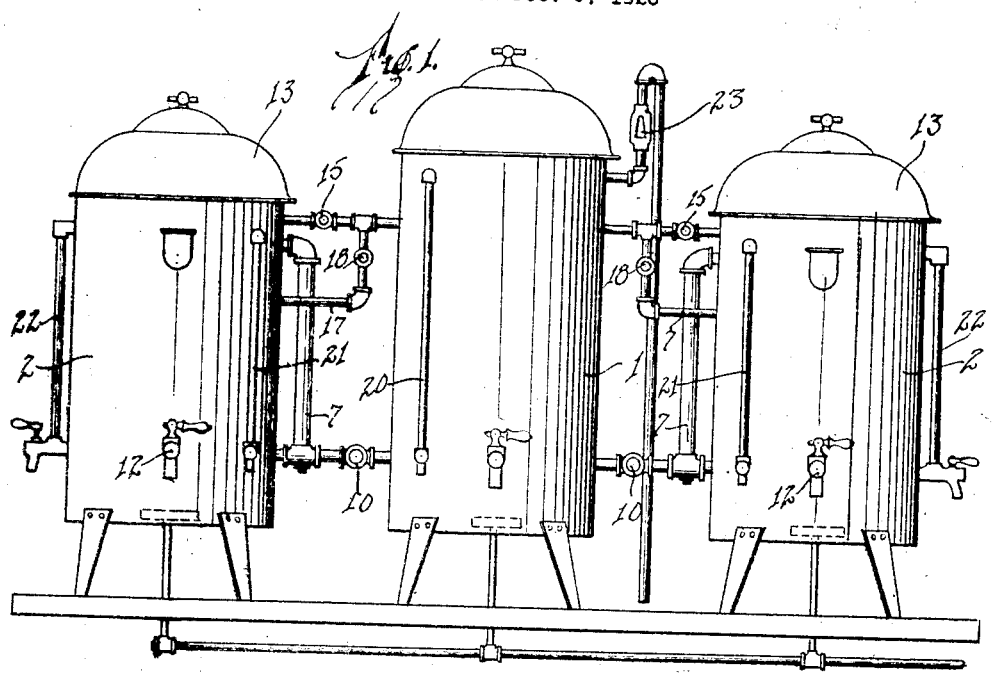
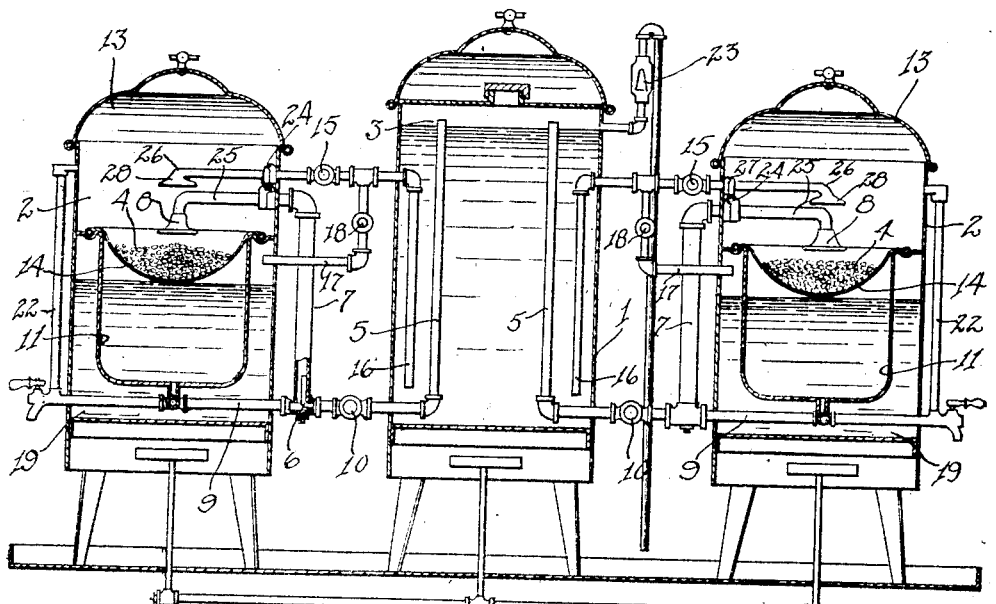
INVENTOR
G.P. Petropulos
BY
ATTORNEYS Patented May 13, 1924.

1,494,014

UNITED STATES PATENT OFFICE.

GEORGE P. PETROPULOS, OF CHICAGO, ILLINOIS.

COFFEE-MAKING APPARATUS.

Application filed December 6, 1923. Serial No. 679,018.

*To all whom it may concern:*

Be it known that I, GEORGE P. PETROPULOS, a citizen of the United States, and a resident of Chicago, in the county of Cook and State of Illinois, have invented a new and useful Improvement in Coffee-Making Apparatus, of which the following is a full, clear, and exact description.

My invention relates to improvements in coffee making apparatus, and it consists in the combinations, constructions, and arrangements herein described and claimed.

An object of my invention is to provide an improvement over that form of the device shown in my patent of March 7, 1922, No. 1,408,963. In said patent, I disclosed a coffee making device in which means was provided for siphoning the coffee liquid through the coffee grounds without the necessity of draining off a portion of the liquid and then pouring this liquid over the coffee grounds. The patented device showed the pipe which conveyed the coffee liquid from the receptacle to the coffee grounds as being disposed within the receptacle. In the present device this pipe is disposed exteriorly of the receptacle so as to permit the receptacle to be more easily cleaned.

A further object of my invention is to provide a device of the type described in which the siphoning pipe is hinged at a point adjacent to the wall of the receptacle, whereby the pipe may be swung out of position when it is desired to clean the device.

A further object of my invention is to provide a device of the type described in which the pipes that convey the hot water from the boiler to the coffee making devices are disposed below the top of the boiler, whereby the device is able to occupy a much smaller space than does the patented device.

Other objects and advantages will appear in the following specification, and the novel features of the invention will be particularly pointed out in the appended claims.

My invention is illustrated in the accompanying drawings forming part of this aplication, in which—

Figure 1 is a front elevation of the device, and

Figure 2 is a vertical section through the device.

In carrying out my invention I provide a boiler 1 and two coffee making devices 2. The coffee making devices 2 are similar in construction, and a description of one will therefore suffice for both. A pipe 5 which conveys the steam from the boiler 1 to the coffee grounds 4 extends from the boiler 1 at a point adjacent to the bottom of the boiler instead of extending through the top of the boiler as shown in the patented device. It will therefore appear from this construction that the device may be placed in a smaller space than could the patented device, since in the present device, the pipes 5 do not project above the top of the boiler 1.

It will be noted from Figure 2 that the small L-shaped pipe 6 communicates with the pipe 5 and directs the steam from the pipe 5 to a pipe 7 that in turn communicates with the nozzle 8. This small pipe 6 prevents the steam from passing through the pipe 9 that is connected with the pipe 5. When the valve 10 is opened, the steam from the boiler 1 will flow through the pipe 5 the pipe 6, and out through the nozzle 8, the steam entraining the coffee liquid that flows from the coffee receptacle 11. In this manner, the coffee liquid is drawn from the receptacle 11 and flows through the pipe 9, the pipe 7, and out through the nozzle 8. The coffee after passing through the nozzle 8, flows through the coffee grounds 4 and back into the receptacle 11. This operation continues as long as the valve 10 is open. In this way, the coffee in the receptacle 11 may be made stronger without the necessity of draining the coffee through the faucet 12 and pouring this coffee back into the receptacle through the cover 13.

In making the coffee, the bag 14 containing the coffee grounds is placed in the top of the receptacle 11. The valve 15 of a pipe 16 is now opened, and permits hot water from the boiler 1 to pass into the receptacle 11. It will further be noted that I have provided a by-pass 17 and a valve 18, the by-pass connecting the pipe 16 with a water jacket 19. The water in the water jacket 19 aids in keeping the coffee liquid in the receptacle 11 warm.

From the foregoing description of the various parts of the device, the operation thereof may be readily understood. As heretofore stated, the coffee bag 14 is placed in the top of the receptacle 11 when it is desired to make coffee. The hot water from the boiler 1 is drawn through the pipe 16 when the valve 15 is opened. The water jacket 19 is also filled with water from the boiler 1. If now, the operator desires to make the coffee in the receptacle 11 stronger, he merely opens the valve 10, whereupon the steam from the boiler 1 will siphon the liquid in the receptacle 11, so as to pass through the coffee grounds 4. As clearly shown in Figure 1, the coffee may be drawn off through the faucet 12. The boiler 1 and the coffee making devices 2 are provided with gauges, the boiler 1 having a water gauge 20, and the coffee making devices 2 being provided with liquid gauges 21. The receptacle 11 is provided with a water gauge 22. The liquid gauges 21 are in communication with the water jackets 19 and show the amount of water in these jackets. The boiler 1 has a standard steam valve 23 in communication therewith.

It will be noted from Figure 2 that the pipe 7 is provided with a hinge 24 adjacent to the wall of the casing. This hinge or pivot joint permits the section 25 of the pipe to be swung into a position to permit the coffee bag 14 to be removed from the receptacle 11. Furthermore, this construction also permits the coffee making device to be easily cleaned when desired. The device is exceedingly simple in construction, and has two distinct improvements over the patented device; i. e., the pipes 5 extend from a point adjacent to the bottom of the casing in lieu of projecting above the top of the boiler 1, and the pipe 7 is disposed exteriorly of the coffee making devices 2 so as to permit the coffee making devices to be readily cleaned when desired. The portion of the pipe that extends into the coffee making devices 2 is adapted to be swung out of the way so as to permit the coffee bag 14 to be removed and to permit the receptacle 11 to be cleaned.

The pipe 16 has an extension 26 that is hingedly secured thereto at 27. The pipe 26 has a spraying nozzle 28 that is similar to the nozzle 8. Both of the nozzles 8 and 28 are adapted to spray the liquid passing therethrough over the entire bag 14 whereby the liquid will pass through all of the coffee grounds.

I claim:

1. A coffee making device comprising a boiler, a coffee making receptacle, a pipe placing said boiler in communication with said receptacle, a second pipe communicating with the bottom of said receptacle, and with said first named pipe at a point exterior of the wall of said receptacle, and a stub pipe communicating with said first named pipe exterior of said receptacle and extending into said receptacle, said stub pipe being provided with a pivot joint adjacent to said receptacle wall.

2. In a coffee making device, a boiler, a receptacle, a pipe placing said boiler in communication with said receptacle, a second pipe communicating with said first named pipe at a point exterior of said receptacle and with said receptacle adjacent to the top of said receptacle, and a pipe disposed in said first and second named pipes and being adapted to direct the steam from said first named pipe to said second named pipe.

3. A coffee making device comprising a boiler, a coffee making receptacle, a pipe placing said boiler in communication with said receptacle, said pipe having its inlet disposed at the top of said boiler, a second pipe placing said boiler in communication with said receptacle and having its inlet disposed at the bottom of said boiler, and stub pipes hingedly secured to said first and second named pipes at a point adjacent to the wall of the receptacle.

GEORGE P. PETROPULOS.